Jan. 22, 1929.
H. HIRSCH ET AL
1,699,589
TESTING APPARATUS FOR MEASURING THE COMPRESSIBILITY
OF BODIES SOFTENING WHEN COMPRESSED
Filed Dec. 10, 1924   3 Sheets-Sheet 1
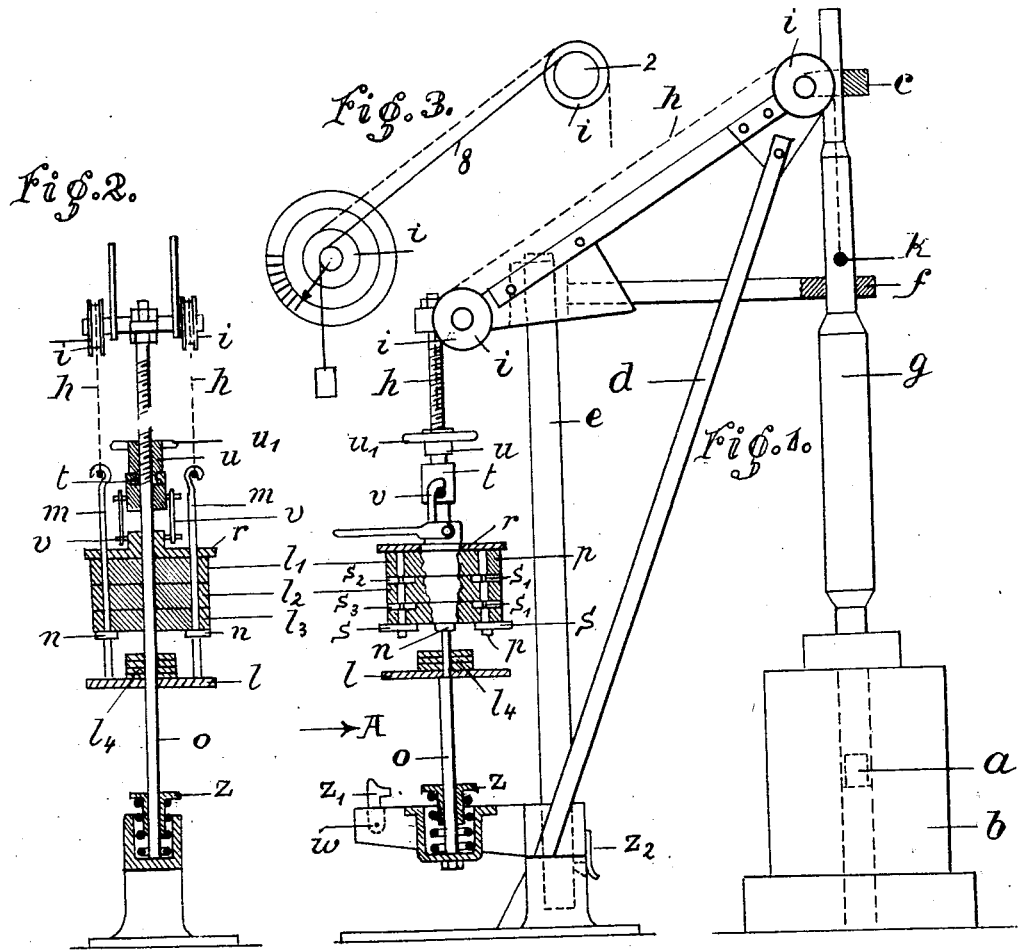
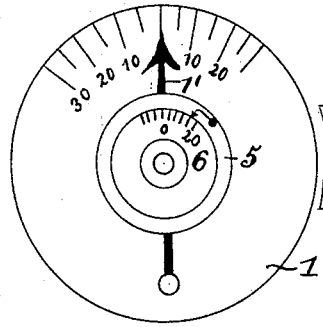
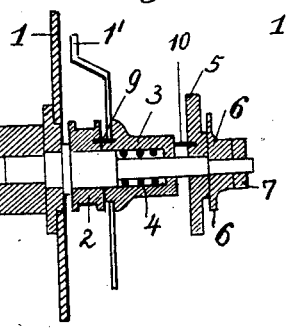
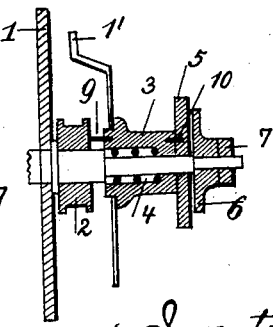

Jan. 22, 1929.
H. HIRSCH ET AL
1,699,589
TESTING APPARATUS FOR MEASURING THE COMPRESSIBILITY
OF BODIES SOFTENING WHEN COMPRESSED
Filed Dec. 10, 1924  3 Sheets-Sheet 2
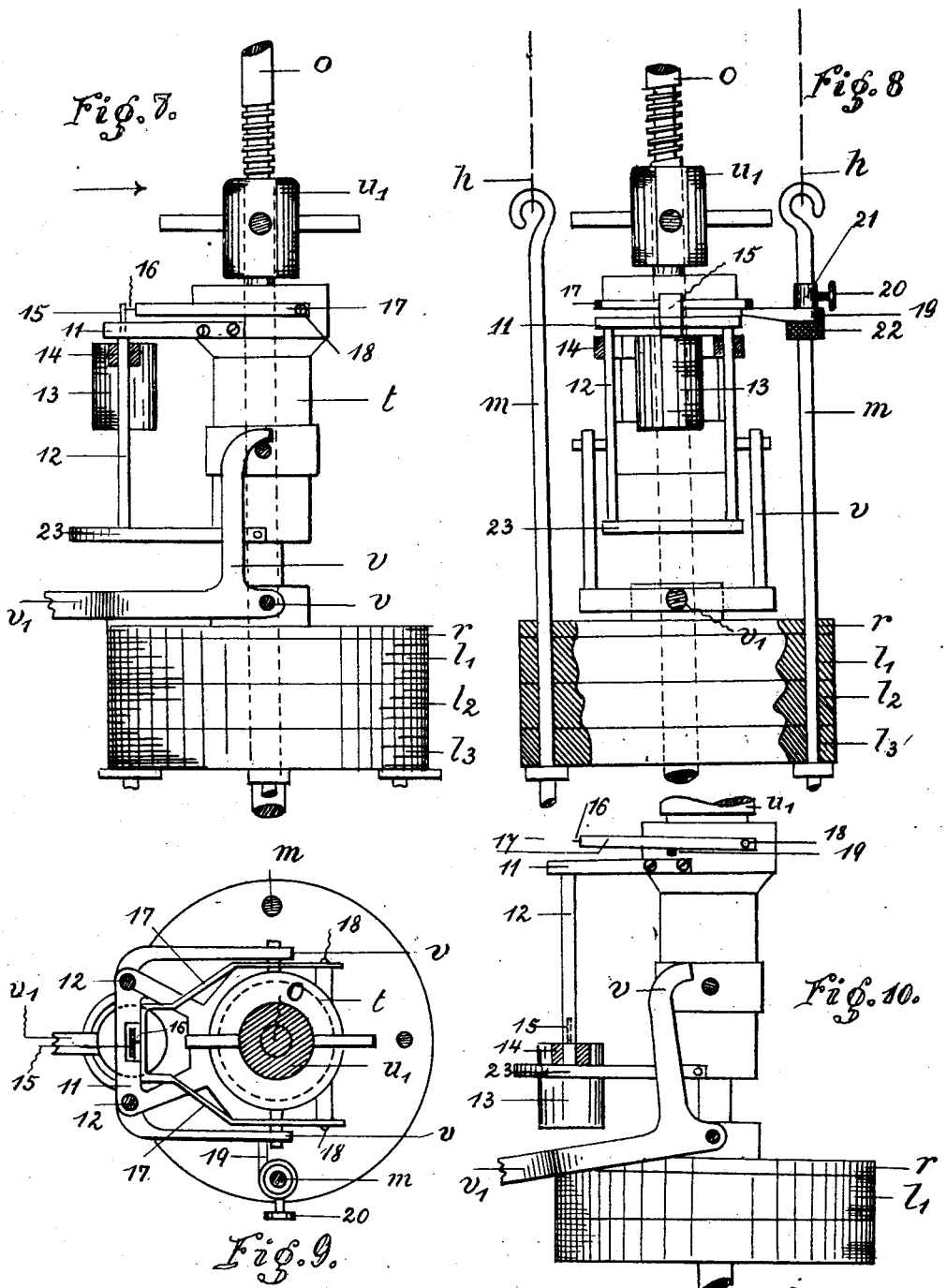
Inventors
Hans Hirsch
Hans Hecht
By [signature] atty Jan. 22, 1929. 1,699,589
H. HIRSCH ET AL
TESTING APPARATUS FOR MEASURING THE COMPRESSIBILITY
OF BODIES SOFTENING WHEN COMPRESSED
Filed Dec. 10, 1924  3 Sheets-Sheet 3
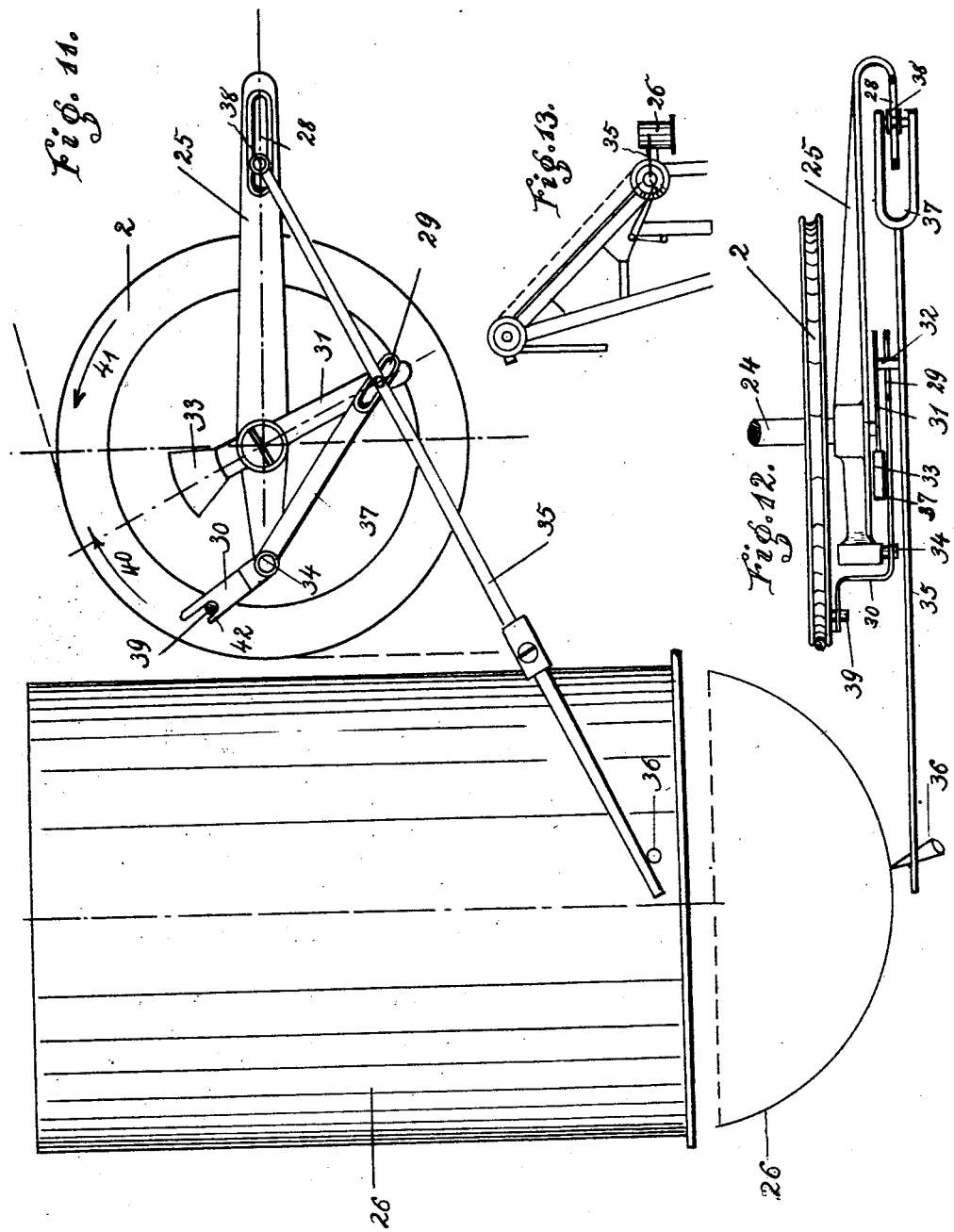

Patented Jan. 22, 1929.

1,699,589

UNITED STATES PATENT OFFICE.

HANS HIRSCH AND HANS HECHT, OF BERLIN, GERMANY.

TESTING APPARATUS FOR MEASURING THE COMPRESSIBILITY OF BODIES SOFTENING WHEN COMPRESSED.

Application filed December 10, 1924, Serial No. 755,073, and in Germany December 19, 1923.

This invention relates to a testing apparatus for measuring the compressibility of bodies softening, when compressed, and is specially adapted for testing at raised temperatures.

The main feature of this invention is, that a weight hanging on a crane-like frame and balanced by a counterweight, so that a desired weight of the loading body is obtained is removed automatically from the body to be tested when a desired compression has taken place, that it to say, when the loading body after having first been carefully placed on the test piece descends on the test piece a desired distance.

The crane-like frame is mounted to swing around a stationary column, so that the opening of the furnace containing the body to be tested becomes free of the loading member by swinging the frame together with the loading body to one side. The loading member or body and its counterweight are joined by chains, ropes or the like guided over pulleys of the frame.

A registering device, which can be disengaged automatically, provided with a hand or writing device or both, is set going by one of these pulleys or wheels.

The counterweight on the frame opposite to the loading body is somewhat heavier than the weight of the loading body, the latter being when at rest always in the highest position. In order to permit the loading body to compress the body to be tested to variable extents the counterweight is variable according to the compression desired by removing weights from the counterweight. When the desired compression is reached, that is, when the loading body after having first been carefully placed on the piece to be tested has descended the desired distance, it is automatically lifted from the test piece.

The counterweight therefore consists of several weights, discs or the like so fixed on a supporting plate that single discs can be removed and operatively transferred for action on a scale pan, if necessary, with several smaller fractional weights. The counterweight as well as the weight holding plate is hung by a rope and guided by a stationary column, and for this purpose the plate and weights are provided with central perforations, so that they slide along the column. Furthermore, each counterweight has two perforations through which pass the suspending rods of the plate, and said suspending rods have collars to sustain the weights. Upon the stationary column is mounted a sleeve slidable, but not revoluble thereon, which, in combination with a hand wheel that has thread engagement with the stationary column, can be adjusted longitudinally of the column. The sleeve and the counterweight, consisting of several disc weights are connected by pawl or similar disconnecting devices. When the pawl is engaged, the counterweight hangs on the stationary column, and the loading body compresses the body to be tested with its full weight.

By removing one, or several disc weights, according to the load desired, the weight of the loading body can be diminished and the removed weights react on the scale pan and diminish the load to be applied to the test piece. For this purpose the single disc weights hang on two bolts secured to a supporting plate. The bolts are provided with necks and the disc-weights have corresponding notches, where forked pins or the like pass. If, for example, the lower disc-weight is to be removed, the two pins of this disc are withdrawn and the disc rests on the collars of the rods of the scale pan, whereupon the pins are placed in the next notch. The supporting plate is connected by a pawl with a sleeve and the hand wheel, and by turning the latter the weights hanging from the supporting plate are raised from the separated weight on the scale pan after the bolts have been withdrawn from the separated weight. By turning the hand-wheel, the distance of the separated disc weights from those inactively supported, can be varied in accordance with the altitude of compression of the body to be tested.

The desired extent of compression of the body to be tested is completed when the counterbalancing weight on the scale pan strikes the ineffective weight supported on the column. At this moment the pawl holding the ineffective weights is disconnected, the full weight acts upon the loading element and the latter is drawn upward. A lug is provided with means for immediate disconnection at the limit of movement and a weight released to fall and disconnect the pawl. This falling weight is detachably connected with a lever fastened on the adjustable sleeve.

On one of the rods that support the scale pan is fastened a lug by a sliding sleeve with screw. The lug can be adjusted by a micrometer screw. When the rods move upward the lug finally touches the lever and moves it upward, whereby the coupling of the falling weight and the lever is disconnected. The weight slides down along guide bars, falls upon a projecting lever of the pawl and immediately disconnects the pawl to transfer all the weights to the scale pan.

The stationary column has a counter-bearing with springs, to diminish the shock, and the scale-pan can be latched to this bearing by another pawl.

The registering device for observing the curve of distension and softening is automatically raised, and remains in such position. It is operated by a rope-wheel on the axle of the guide wheels of the apparatus. It is a combination of a graduated dial-plate, a sliding sleeve fastened by a spring on the axle of the rope-wheel and an adjusting wheel with a graduated disc. The sleeve is coupled disconnectably on the one hand with the rope-wheel and on the other hand with the adjusting wheel; whereby the indicator is disconnected at the moment when the loading body rises. Instead of using a registering device having an indicator hand, an automatic writing apparatus with rotating drum may be employed.

This writing device consists of a rotating drum provided with paper, and a writing lever having a pencil or ink pen.

The main features of the writing or recording device are a double guide by means of links for a lever having a pencil, and the direct driving of this lever by a lever having a slot. Another feature of the writing or recording device is the automatic disconnection of the slotted lever and thereby of the indicator or recording device.

In a slot in one end of the slotted lever slides a journal, connected with the writing lever, whereby the latter is driven. The writing lever is pivoted intermediate its ends on a pin carried by an auxiliary lever. Thus the pencil is guided straight. To disconnect the indicator at the proper moment, the slotted lever has on its other end an arm, which is connected with the moved part of the apparatus, a rope-wheel or the like, in a convenient manner for easy disconnection. The arm of the slotted lever is bent and slotted for the entrance of a pin. This fork has a short and a long tooth. When testing, the pin on the rope-wheel first presses against the long tooth of the slotted lever, driving the writing lever. As soon as the softening starts the rope-wheel is turned in the opposite direction, the journal pressing against the short tooth. When the compression is reached, the journal slides from the fork of the bent arm over the short tooth, and thus the indicator is stopped.

The slotted lever and the writing lever are mounted on a two-armed bar which, for example, rotates around the axle of the rope wheel and can be fixed there. The short arm of this bar is pivotally connected to the slotted lever, whereas the long arm is slotted, a sliding block at the end of the writing lever running in this slot. On the axle of this bar is another lever, having on one end a journal passing through the slot of the slotted lever and fastened on the writing lever. On the other end of this lever is a weight to balance the slotted lever and the writing lever. When the slotted lever driven by the rope-wheel swings, the connected writing lever, sliding in the slot of the two-sided bar is set in motion.

The accompanying drawing shows one form of the testing apparatus.

Figure 1 is a side view with some parts in section.

Fig. 2 is a vertical section of the weight device seen from A.

Fig. 3 is the registering device having a hand for automatic disconnection.

Figs. 4, 5 and 6 are enlarged drawings of the indicator, in front view and longitudinal section.

Fig. 7 is a side view of the disconnecting device for the pawl.

Fig. 8 is a front view in the direction of the arrow Fig. 7, partly in section.

Fig. 9 is a plan of Fig. 7.

Fig. 10 is a view similar to Fig. 7 showing the pawl disconnected.

Fig. 11 shows the recording device on an enlarged scale.

Fig. 12 is a plan thereof.

Fig. 13 shows the connection of the recorder with the apparatus.

The body $a$ to be tested for compressibility under heat is within a furnace, for example an electrical furnace, $b$. The testing apparatus consists of a frame $d$ similar to a crane, swinging around a stationary pillar $e$, so that it may be swung aside and the opening of the furnace may be free. The frame $d$ is provided with two guides $c$ and $f$ guiding the loading body $g$ which can be moved up and down, and which hangs on chains or ropes $h$ guided over wheels $i$. The ropes $h$ are fixed on the bolt $k$ above the centre of gravity of the loading body $g$. At the other end of the ropes $h$ is fixed the special weight. This weight consists of the scale pan $l$ whose supporting rods $m$ are hooked in loops of the ropes. The pan $l$ carries the smaller weights $l_1, l_2, l_3$, $l_4$ for tare, whereas the larger weights $l_1, l_2, l_3$ are supported on the rods $m$ by the collars $n$. The whole weight arrangement is mounted on a vertical guide rod $o$ passing through the weights and the scale pan and connected at both ends in a convenient manner with the swinging frame $d$.

The weight resting on the collars $n$ consists of several parts, $l_1, l_2, l_3$ suspended by bolts $p$ from a supporting plate $r$ and held in place by forked pins $s$. Each of the disc-weights $l_1, l_2, l_3$ can be released from the bolts by transferring locking pins $s$. Therefore the bolts $p$ are provided with necks $s_1$ under each plate, whereas the plates themselves have notches $s_2$ to pass the pins $s$. If, for example, the lower disc-weight is to be removed, both the pins $s$ are withdrawn and placed in the notch $s_2$ above. When the remaining weight is drawn upward, the bolts $p$ are withdrawn from the lower plate $l_3$ and allow it to rest on the collars $n$ and act as weight of difference upon the loading body $g$.

The device for raising the upper weight and putting it out of action consists of a sleeve $t$ sliding but not rotating on the guide rod $o$, being in this part of square or similar cross section, or provided with slot or key joint to the sleeve $t$ to prevent the sleeve from rotating on the column. The lengthened hub $u$ of a hand wheel $u_1$ is internally threaded to rotate on a threaded portion of the guide rod $o$ and has a neck that enters the sleeve $t$ which is detachably connected by a pawl $v$ with the suspending plate $r$ carrying the counterweights $l_1, l_2, l_3$. As soon as the necessary counterweight to adjust the effective weight of the loading body $g$ to that desired is separated by the pins $s$, the plate $r$ and sleeve $t$ are connected by the pawl $v$ and the upper weights $l_1, l_2$ can be raised out of operation by turning the hand wheel $u_1$ on the guide rod $o$. The distance between the disc weights $l_3$ and $l_2$ corresponds to the extent to which the body $a$ to be tested shall be compressed.

The weight $l_3$ and the smaller weights $l_4$ necessary for an exact regulation of the pressure load the scale pan $l$ and move upward, when the loading body $g$ slowly descends in accordance with the compression of the body $a$ to be tested. When the disc weight $l_3$ supported by the rods $m$ touches the lower disc weight $l_2$, connected with the supporting plate $r$ the pawl $v$ is disconnected from the sleeve $t$ and the full weight $l_1, l_2, l_3$ acts upon the scale pan $l$. The loading body $g$ then moves upward and is removed from the body $a$ to be tested.

The guide rod $o$ is mounted in a jack $w$ rotating around the main support $e$ of the frame, and an elastic counter-bearing $z$ in the jack $w$ receives the shock of the falling weight and scale pan $l$. The pan $l$ can be latched in this position by the pawl $z_1$, and another pawl $z_2$ serves for connecting or disconnecting the frame $w$ in the main support $e$.

Figs. 7 to 10 show a modification of this device. The sliding sleeve $t$ is mounted on the guide rod $o$ and connected with the hand wheel $u_1$ rotatable on a screw thread of the guide rod $o$ as before. The plate $r$ carrying the disc weights $l_1$–$l_3$ is connected to the sleeve $t$ by the pawls $v\ v_1$. The ropes $h$ connect the scale pan with the loading body. The upper and lower part of the sleeve $t$ is provided with frames 11 and 23 connected together by two bars 12 for guiding a pawl-releasing weight 13, which is provided with projections 14 through which the bars 12 pass. The weight 13 has an upper plate 15 with a small groove, a pin 16 enters this groove and is carried on the front of a frame 17 connected at journal 18 with the sleeve $t$. This frame 17 can swing in an upward direction.

When not used, the releasing weight 13 is connected with the lever 17 by the pin 16 entering the groove of the plate 15. The disconnection of the lever 17 is effected by a lug 19 which is slidable on one of the rods $m$ of the scale pan and adjustably fastened there by a screw 20.

To get a very exact regulation of the lug 19 according to a previously determined compression, the lug 19 is mounted on a sleeve 21 having a micrometer screw 22. When, according to the compression of the body to be tested, the rods $m$ move upward the lug 19 finally reaches the lever 17, said lug moves the latter upward, as shown in Fig. 10, whereby the pin 16 is removed from the groove of the plate 15 and the weight 13 falls down upon the hand lever $v_1$ of the pawl $v$ thereby disconnecting it. The separated weights, for example $l_1$ and $l_2$ thus released serve again as a counterweight which is greater than the loading body and raises the latter from the body to be tested. The pawl releasing weight 13 rests with its projections 14 upon the lower frame 23 and can again be raised and connected for another test with the pin 16 of the lever 17.

The registration device having a hand is shown in Figs. 3, 4, 5 and 6, the latter three figures being enlarged. It is operated by the rope wheel 2 on the axle of the wheel $i$. It consists of a dial plate 1 with graduation, and a hand 1' fastened on a sleeve 3, which can move longitudinally with the aid of a spring 4. Next to the sleeve 3 is a wheel 5 and a graduated disc 6, a nut 7 serving as a counter-bearing. The sleeve 3 has a pin 9, which enters a hole of the rope-wheel 2. Furthermore, the wheel 5 has a pin 10 that enters a bore in the sleeve 3.

At the beginning of the test the large hand 1' is, for example, set at 0° and the rope wheel 2 is turned so that the pin 9 of the sleeve 3 enters the bore of the rope wheel 2. Now the wheel 5 is turned so far that the hand 1' will indicate the desired maximum compression, which is permitted by the hand wheel $u_1$. The graduation of the disc 6 serves for an exact adjusting (see Fig. 5, where the hand is connected). In the present case the disc 5 is, for example, placed on 20°. If the hand makes during the test a turn of 20° by the motion of the rope wheel 2, the pin in the wheel 5 will come opposite a bore in the sleeve 3. The spring 4 presses the sleeve 3 against the wheel 5 and thereby disconnects the pin-joint between the sleeve 3 and the rope wheel 2, so that the hand 1' remains in its position.

Figs. 11 and 12 show the recording device on an enlarged scale. This device is set in operation from the upper wheel $i$ of the testing apparatus by means of a cord. At the moment when the weight $g$ rises automatically, it is automatically disengaged and remains so.

The rope wheel 2 is loosely mounted on the axle 24 on which the two-armed bar 25 is pivoted. On the short arm of this bar, 25, is pivoted the swinging slotted lever 37, rotating around the journal 34. The long arm of this bar 25 has a slot 28 at the end. The lever 37 is slotted at one end, 29, and bent at the other end to form an arm 30, to effect the coupling with the rope wheel 2. The journal 32 entering the slot 29 is carried by a lever 31 loosely mounted on the journal 24, and the other arm of this lever 31 has a counterweight 33 to equalize the weight of the slotted lever 37, and the lever 35, that is provided with the writing device. The journal 32 passes through the slot 29 and is fastened on the writing lever 35 having the writing pin 36 on one end. The other end of the writing lever 35 has a fork 37 and carries the slide 38 sliding in the slot 28 of the bar 25 when the writing lever 35 is moved by the slotted lever 37. The slotted lever 37 is operated by a pin 39 on the rope wheel 2. For this purpose the slotted lever 37 is provided with a fork on its bent arm 30 where the journal 39 enters.

When the bodies to be tested expand at raised temperatures and then are compressed by the loading member $g$ the rope wheel 2 first turns in the direction of arrow 40. The pin 39 in the worked arm 30 moves the slotted lever 37 which moves the writing lever 35. As soon as the compression starts, the rope wheel 2 turns in the direction opposite of arrow 41. The pin 39 touches the short projection 42 of the fork, moves the slotted lever 37 and slides out of the fork when the compression of the body to be tested is finished, thereby placing the registering device out of operation.

We claim—

1. The combination with a furnace having a hole in its top, a crane-like support independent of the furnace and having a movable rope thereon, a testing weight on one end of the rope arranged to enter said hole and variable counter weighting means on the other end of the rope to change the effective load of the testing weight.

2. In a testing mechanism, a swinging crane, guide pulleys thereon, a rope passing over said pulleys, a loading member for loading a compressible test piece and suspended from said rope, a counterweighting device connected to the other end of said rope and comprising a scale pan, weights, means to detachably suspend said weights over said pan and means operating to release said weights to become effective with respect to the pan to overbalance said member after said member has effected a pre-determined compression.

3. In a testing mechanism, a swinging crane, guide pulleys thereon, a rope passing over said pulleys, a loading member for loading a compressible test piece and suspended from said rope, a counterweighting device connected to the other end of said rope and comprising a scale pan, weights, means to detachably suspend said weights over said pan, means operating to release said weights to become effective with respect to the pan to overbalance said member after said member has effected a predetermined compression, and means to adjust the level at which said weights are held.

4. In a testing machine, a swinging crane, guide pulleys thereon, a rope passing over said pulleys, a loading member for loading a compressible test piece and suspended from one end of said rope, a vertical guide rod adjacent said crane, a scale pan slidable on said rod and secured to the other end of said rope, a sleeve adjustable on said rod, weights detachably suspended from said sleeve and means to release said weights at will for operative action with respect to said pan.

5. In a testing machine, a swinging crane, guide pulleys thereon, a rope passing over said pulleys, a loading member for loading a compressible test piece and suspended from one end of said rope, a vertical guide rod adjacent said crane, a scale pan slidable on said rod and secured to the other end of said rope, a sleeve adjustable on said rod, weights detachably suspended from said sleeve, means to release said weights at will for operative action with respect to said pan, and means to release said weights from said sleeve at each operation of the loading member.

6. In a testing machine, a scale pan, a rod on which said pan is guided, suspending means for the pan detachable weights, weight holding means on said rod, means to detach weights from said holding means and render them effective with respect to said pan, and means to release said weight holding means from said rod after a pre-determined movement of said pan.

7. In a testing machine, a scale pan, a vertical rod on which said pan is slidable, suspending rods for said pan detachable weights, weight holding means movable along said rods, means to adjust the elevation of said weight holding means, means to detach the weights from said holding means to render them effective, and means to release the holding means with the weights thereon after a pre-determined movement of said pan.

8. In a testing machine, a scale pan, a vertical rod on which said pan is slidable, suspending rods for said pan, detachable weights, weight holding means movable along said rods, means to adjust the elevation of said weight holding means, means to detach the weights from said holding means to render them effective, and means to release the holding means with the weights thereon after a pre-determined movement of the pan.

9. In a testing machine, a scale pan, a vertical rod on which said pan is slidable, a sleeve on said rod, a hand wheel connected to said sleeve and having a threaded connection with said rod, suspending rods for said scale pan, weight holding means slidable on said rods, collars on said suspending rods above the scale pan, weights detachably carried by said holding means slidable on said suspending rods, means to release weights from the holding means onto said collars and a detachable connection between said holding means and sleeve.

10. In a testing machine, a scale pan, a vertical rod on which said pan slides, suspending rods for said pan, weight holding means slidable on said rods, a sleeve adjustable on said vertical rod, means to detachably connect said holding means and sleeve, and means moving with said scale pan to automatically disconnect said connecting means.

11. In a testing machine, a scale pan, a vertical rod on which said pan slides, weight holding means, weights detachably connected thereto, suspending rods for said pan passing through said weight holding means, a sleeve adjustable along said vertical rod, a weight suspended from said sleeve, latching means connecting the sleeve and weight holding means, and means on one of said pan suspending rods to release said suspended weight to release said latching means.

12. In a testing machine, the combination with a crane, a movable rope carried thereby, a loading member on one end of said rope, a scale pan on the other end thereof arranged to lower when the weight rises, a vertical guide rod mounted on said crane, weights carried by said rod, means to release the weights from the rod and render them effective with respect to said pan after a pre-determined travel of the pan to raise said loading means, and a latch to latch said pan in its depressed position.

13. In a testing machine, the combination with a crane, a movable rope carried thereby, a loading member on one end of said rope, a scale pan on the other end thereof, arranged to lower when the weight rises and rise when the weight lowers, a vertical guide rod mounted on said crane, weights carried by said rod, means to release the weights from the rod and render them effective with respect to said pan after a pre-determined travel of the pan to raise said loading means, a latch to latch said pan in its lowered position, registering mechanism to register the movement of said loading means, and recording mechanism to record the movements of said loading means.

14. The combination with a furnace having an opening in its top, of a crane swingable over said furnace, loading means carried by said crane to pass through said opening and engage a test piece in said furnace, a vertically movable scale pan connected to and movable with said loading means, means carried by said crane sufficient to overbalance the weight of said loading means, means to release said overbalancing means and render it effective after the loading means has moved a predetermined extent in compressing the test piece, means to latch said pan in its lowermost position to maintain the loading means raised, and means to latch the crane against swinging.

In testimony that we claim the foregoing as our invention, we have signed our names.

Dr. HANS HIRSCH.
Dr. HANS HECHT.